United States Patent
Blonskey et al.

(10) Patent No.: US 11,818,697 B2
(45) Date of Patent: Nov. 14, 2023

(54) TECHNIQUES FOR EFFICIENT OPERATION OF A CRITICAL MISSION WIRELESS COMMUNICATION SYSTEM IN CONFINED AREAS

(71) Applicant: CoreTigo, Ltd., Netanya (IL)

(72) Inventors: Ofer Blonskey, Even Yehoda (IL); Yaniv Yardeni, Tel-Aviv (IL); Harel Arnon, Netanya (IL)

(73) Assignee: CORETIGO, LTD., Netanya (IL)

( * ) Notice: Subject to any disclaimer, the term of this patent is extended or adjusted under 35 U.S.C. 154(b) by 24 days.

(21) Appl. No.: 17/318,151

(22) Filed: May 12, 2021

(65) Prior Publication Data
US 2021/0289503 A1   Sep. 16, 2021

Related U.S. Application Data

(63) Continuation-in-part of application No. 17/202,858, filed on Mar. 16, 2021.

(60) Provisional application No. 63/024,194, filed on May 13, 2020, provisional application No. 62/990,243, filed on Mar. 16, 2020.

(51) Int. Cl.
*H04B 7/00* (2006.01)
*H04W 72/0453* (2023.01)
*H04W 4/80* (2018.01)
*H04B 7/26* (2006.01)

(52) U.S. Cl.
CPC ...... *H04W 72/0453* (2013.01); *H04B 7/2612* (2013.01); *H04W 4/80* (2018.02)

(58) Field of Classification Search
CPC ........... H04W 72/0453; H04W 88/085; H04W 88/02; H04W 76/15; H04W 4/80; H04W 84/20; H04W 52/243; H04W 40/12; H04B 7/2612; H04B 1/713; H04B 1/715; H04B 2001/7154
See application file for complete search history.

(56) References Cited

U.S. PATENT DOCUMENTS

| | | | |
|---|---|---|---|
| 8,384,499 B2 | 2/2013 | Suzuki et al. | |
| 8,976,835 B2 * | 3/2015 | Sarca ................... | H04B 1/7183 370/347 |
| 9,660,698 B2 | 5/2017 | Derneryd et al. | |
| 10,784,584 B1 | 9/2020 | McNutt | |
| 2010/0194500 A1 | 8/2010 | Suzuki et al. | |
| 2016/0112095 A1 | 4/2016 | Derneryd et al. | |
| 2019/0317181 A1 | 10/2019 | Matsumoto | |

(Continued)

*Primary Examiner* — Nhan T Le
(74) *Attorney, Agent, or Firm* — M&B IP Analysts, LLC (57) ABSTRACT

An apparatus for wirelessly increasing the number of communication channels in a critical mission wireless communication system installed in a confined area is provided. The system includes a transmitter configured to transmit radio signals at a first frequency band, wherein the first frequency band is higher than a standard frequency band defined by a critical mission wireless communication protocol of the critical mission wireless communication system; and a plurality of receivers, wherein each plurality of receivers is wirelessly connected to the transmitter and configured to receive signals at the first frequency band transmitted by the transmitter and processed signals at the standard frequency, wherein the plurality of receivers and the transmitter are part of the critical mission wireless communication system.

21 Claims, 7 Drawing Sheets

(56) References Cited

U.S. PATENT DOCUMENTS

2020/0358162 A1  11/2020  Yang et al.
2020/0396048 A1* 12/2020  Moshfeghi ........... H04B 1/0064
2021/0127452 A1   4/2021  Uchida et al.
2021/0218438 A9   7/2021  Scherer et al.

* cited by examiner

TECHNIQUES FOR EFFICIENT OPERATION OF A CRITICAL MISSION WIRELESS COMMUNICATION SYSTEM IN CONFINED AREAS

CROSS REFERENCES TO RELATED APPLICATIONS

This application claims the benefit of U.S. Provisional Application No. 63/024,194 filed on May 13, 2020. This application is also a continuation-in-part application of U.S. patent application Ser. No. 17/202,858 filed on Mar. 16, 2021, now pending, which claims the benefit of U.S. Provisional Application No. 62/990,243 filed on Mar. 16, 2020, the contents of which are hereby incorporated by reference.

TECHNICAL FIELD

The present disclosure relates generally to the wireless control and monitoring for a large number of devices in a confined area.

BACKGROUND

Industrial systems include a variety of components, including a multitude of sensors and actuators, implemented to execute various automated tasks in order to produce a desired product or carry out a specific process. Each individual industrial component should either be controlled, e.g., an actuator must be told to move a robotic arm in a particular manner, or communicated with, e.g., a sensor value reading must be received to adjust a process accordingly.

Figure 1A:
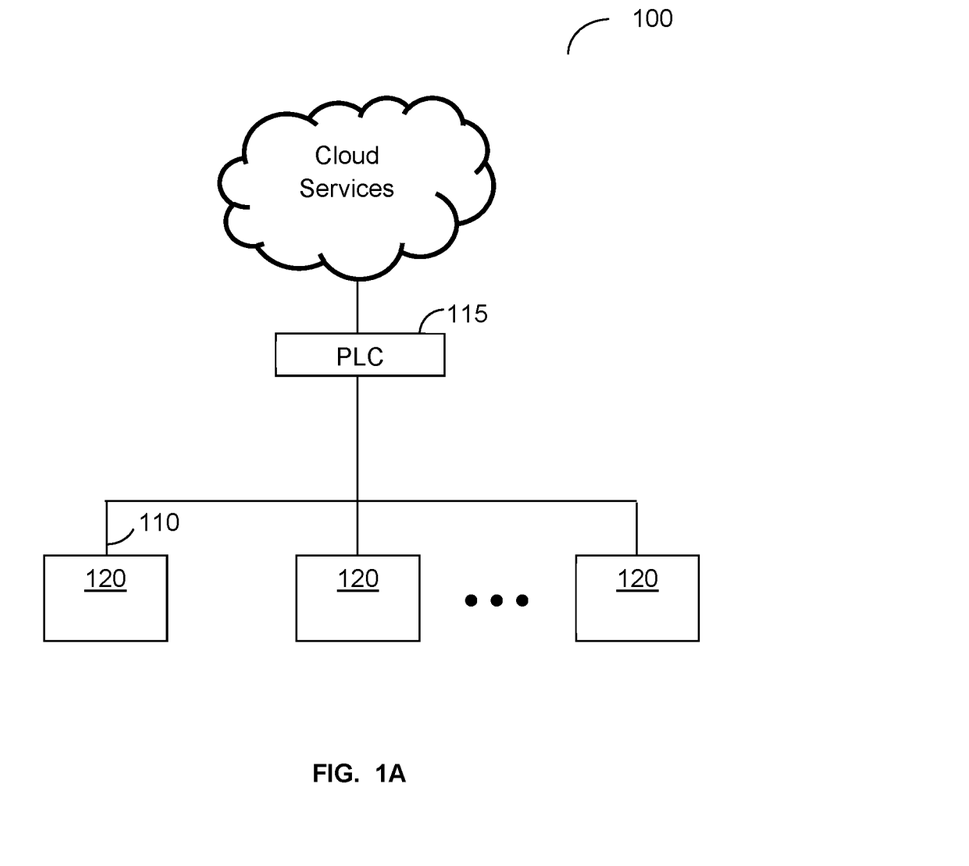
FIGS. 1A and 1B are a diagram of illustrating the control of industrial components.

As shown in FIG. 1A, an industrial system 100 is used to direct individual connections, e.g., via cables 110, to connect a controller, such as a programmable logic controller (PLC) or Programmable Automation Controller (PAC) 115, to each component (or Slave) 120 of the system 100. This is a costly setup and produces many inefficiencies, as it requires a multitude of controllers, even for a single machine having multiple components. The control signal was transmitted using an analog or a digital signal sent over the individual cables 110. While simple in theory, such a setup requires high maintenance, high setup costs, and significant amounts of time spent configuring and setting up each component of the system.

Figure 1B:
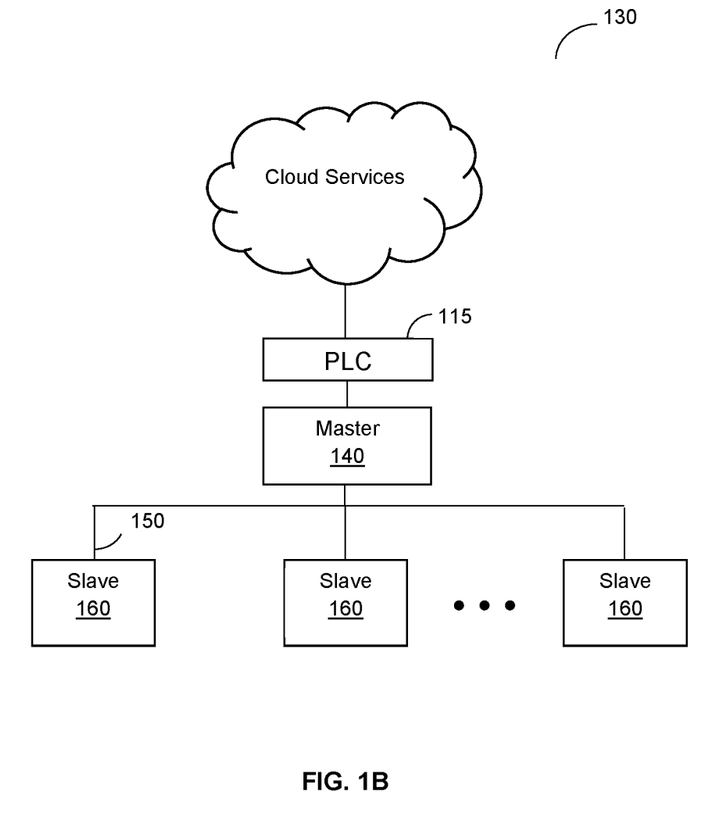

Alternatively, industrial systems, as shown in FIG. 1B, include a mission critical link system 130 with a master gateway (or simply "master") 140 connected to a controller 115 and configured to communicate with multiple industrial components (or Slaves) 160. The master 140 offers a more centralized approach, with a single master 140 connected to many components 160. The connection may be established over direct cable 150 connections. A standardized protocol, such as IO-Link®, is an example implementation of such a system.

A master 140 is configured to connect to multiple devices (e.g., devices that may operate as "slaves" in a master-slave star topology) 160, which may be easily connected to actuators, sensors, and the like. The sensors may include smart sensors providing valuable diagnostic information as well as updated status reports.

A wireless version of the mission-critical wireless link is provided by an emerging wireless standard, IO-Link® Wireless, which is an extension of the wired IO-Link® over a wireless medium. The IO-Link® Wireless (IOLW) specification describes a time-division multiplexing (TDM) uplink network configured to communicate with multiple devices. The master downlink is a broadcast message (i.e., one message sent for all devices) while the multiple devices and components use a synchronous (i.e., synchronized by an external clock) TDM method for uplink.

The IO-Link® Wireless allows communication over the spectrum of the industrial, scientific, and medical (ISM) band. The ISM band is a group of radio frequencies (RF) that are internationally designated for use in the industrial, scientific, and medical fields. In one such band, the channels are spaced apart by 1 megahertz (MHz) and extend from 2401-2480 MHz. Each channel may have one or more wireless transmitters transmitting over that channel.

The ISM band provides many challenges when a reliable communication is a requirement. Specifically, in a confined area it is currently impossible to provide a reliable communication to many devices due to interferences from devices sharing the same spectrum (e.g., devices communicating over Wi-Fi, Bluetooth®, or Bluetooth Low Energy®).

Further, the IOLW, by utilizing the ISM band, is limited in the number of devices 150 that can be supported. Supporting more devices in a confined area currently cannot be achieved using IO-Link® Wireless (IOLW) without modifications.

Therefore, implementing IOLW in a manufacturing setting, such as an assembly line or production floor, may not be an efficient solution.

Figure 2:
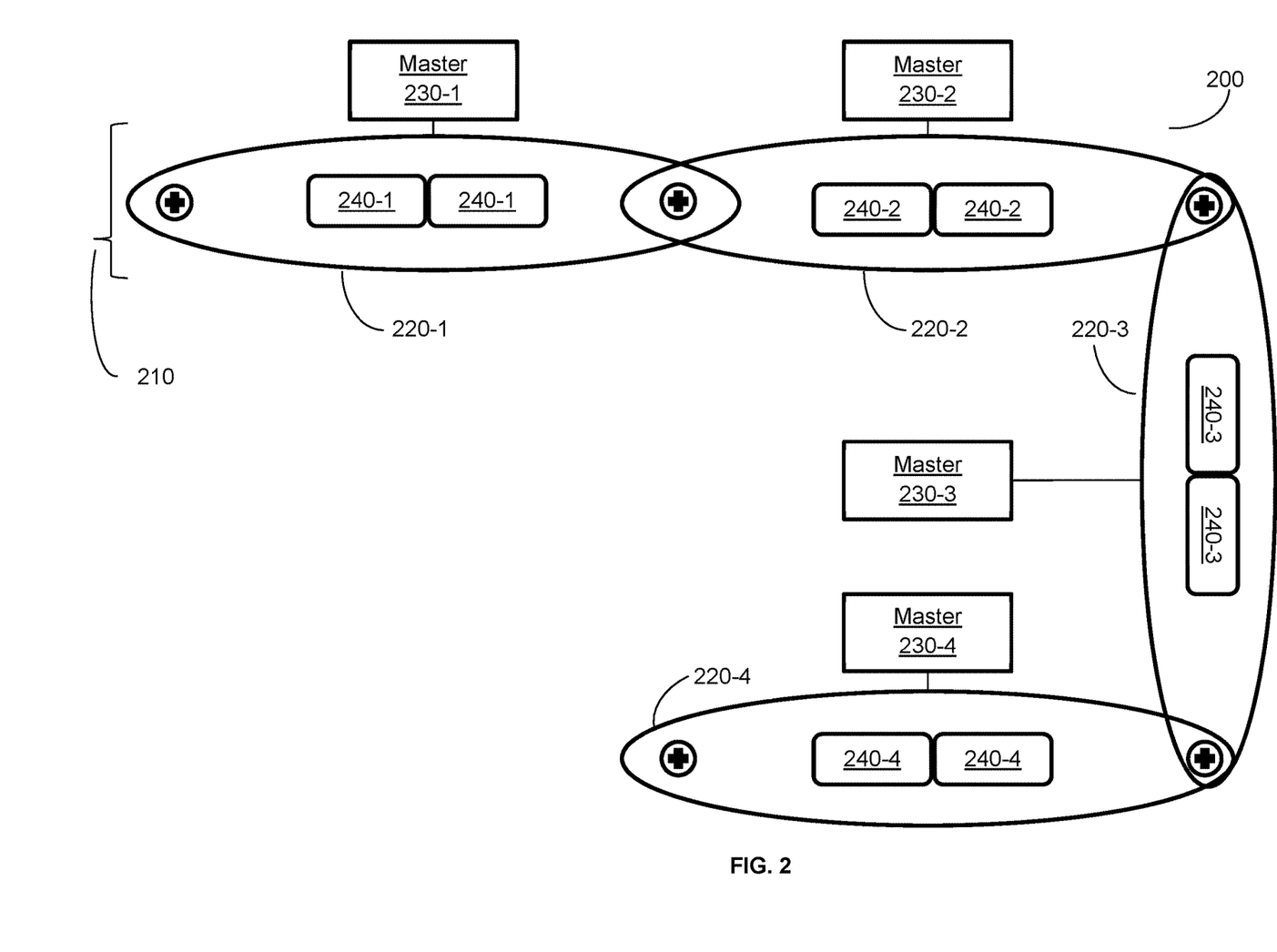
FIG. 2 is a diagram of an assembly line describing the limitation of implementation an IOLW in a confined area utilized to describe the various embodiments.

FIG. 2 is an example diagram of an assembly line 200 describing the limitations of an implementation an IOLW in a confined area. The assembly line 200 includes a conveyor 210 divided into N segments (220-1 through 220-N, where N is an integer number greater than 1). In each segment a different operation is performed.

For example, an assembly line 200 may be configured for packaging bottles. In segment 220-1 liquid is poured into the bottles, in segment 220-2 bottles are sealed, in segment 220-3 labels are added, and segment 220-4 bottles are placed in a box.

Control of the various machines, robots, or like segments 220-$i$ ($i$=1, 2, 3, 4) includes a master 230-$i$ and a plurality is controller devices 240-$i$, being controlled by the respective master. That is, the master 230-1 controls the devices 240-1, but not the devices 240-2, 240-3, and 240-4 and other devices not paired with the respective master 230-1.

As each master 230 communicates with its respective devices 240 over the ISM band, interferences may occur due to communications from other masters 230 or different wireless devices 240. For example, a command sent by a master 230-1 can interfere with a command sent by a master 230-2.

A typical assembly line and production (manufacturing) floor includes hundreds of wireless devices 240, controlled over IOLW. In an embodiment, such a link communicates over the ISM band and cannot meet the requirements of a mission-critical wireless link. Such requirements may include, as examples and without limitation, low latency, robust communication, and reliable communication.

It would, therefore, be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include an apparatus for wirelessly increasing the number of communication channels in a critical mission wireless communication system installed in a confined area. The apparatus comprises: a transmitter configured to transmit radio signals at a first frequency band, wherein the first frequency band is higher than a standard frequency band defined by a critical mission wireless communication protocol of the critical mission wireless communication system; and a plurality of receivers, wherein each plurality of receivers is wirelessly connected to the transmitter and configured to receive signals at the first frequency band transmitted by the transmitter and processed signals at the standard frequency, wherein the plurality of receivers and the transmitter are part of the critical mission wireless communication system.

Certain embodiments disclosed herein include also include a system for a plurality for sectors, wherein each sector is installed with an apparatus designed to increase a number of wireless communication channels in critical mission wireless communications, wherein each apparatus includes: a transmitter configured to transmit radio signals at a first frequency band, wherein the first frequency band is higher than a standard frequency band defined by a critical mission wireless communication protocol of the critical mission wireless communication system; and a plurality of receivers, wherein each plurality of receivers is wirelessly connected to the transmitter and configured to receive signals at the first frequency band transmitted by the transmitter and processed signals at the standard frequency, wherein the plurality of receivers and the transmitter are part of the critical mission wireless communication system

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural, and vice versa, with no loss of generality. In the drawings, like numerals refer to like parts through several views.

The example disclosed embodiments allow for increasing the number of wireless communication channels, and further reducing interferences while meeting the requirements of a critical mission wireless link (CMWL) using a wireless Radio Frequency (RF) transmitter operating in the 5 GHz frequency band (4.9 GHz-6.4 GHz)), while maintaining compliance with the IO-Link® Wireless Standard. These bands are 4.9 GHz and 6.4 GHz. Increasing the number of wireless communication channels further allows to increase the number of devices that can communicate in a confined area without interferences.

The disclosed embodiments may be utilized to provide a reliable CMWL in, for example, a production floor where robots or a tracking system requires a real time control. In particular, the disclosed embodiments are advantageous in areas where there are multiple devices (e.g., sensors, actuators, etc.), and the master is required to operate in such environment without interferences. Further, the ISM band (utilized by the IO Wireless Link) may be blocked due to security measures, and thus communication at a different band is required.

In an embodiment, the wireless RF transceiver may be a system of transmitters and receivers, or transceivers that take wireless signals defined in the CMWL's standard operating, for example, at 2.4 GHz frequency band and upconverts the signal to a 5 GHz frequency band for transmission by antennas, or receives signals operating at the 5 GHz frequency for down-conversion to, for example, the 2.4 GHz frequency band. The frequency band is between 2401 MHz and 2480 MHz, while the 5 GHz is between 4.9 GHz and 6.4 GHz.

It should be noted that down-conversion and up-conversion described herein are only techniques to transfer signals from one band to another. The disclosed embodiments for increasing the number of wireless communication channels in CMWL system can be realized using other frequency band conversion techniques, such as, but not limited to a direct conversion, and the like. For example, a direct-conversion receiver is a radio receiver design that demodulates the incoming radio signal using synchronous detection driven by a local oscillator having frequency is identical to, or very close to the carrier frequency of the intended signal.

Figure 3:
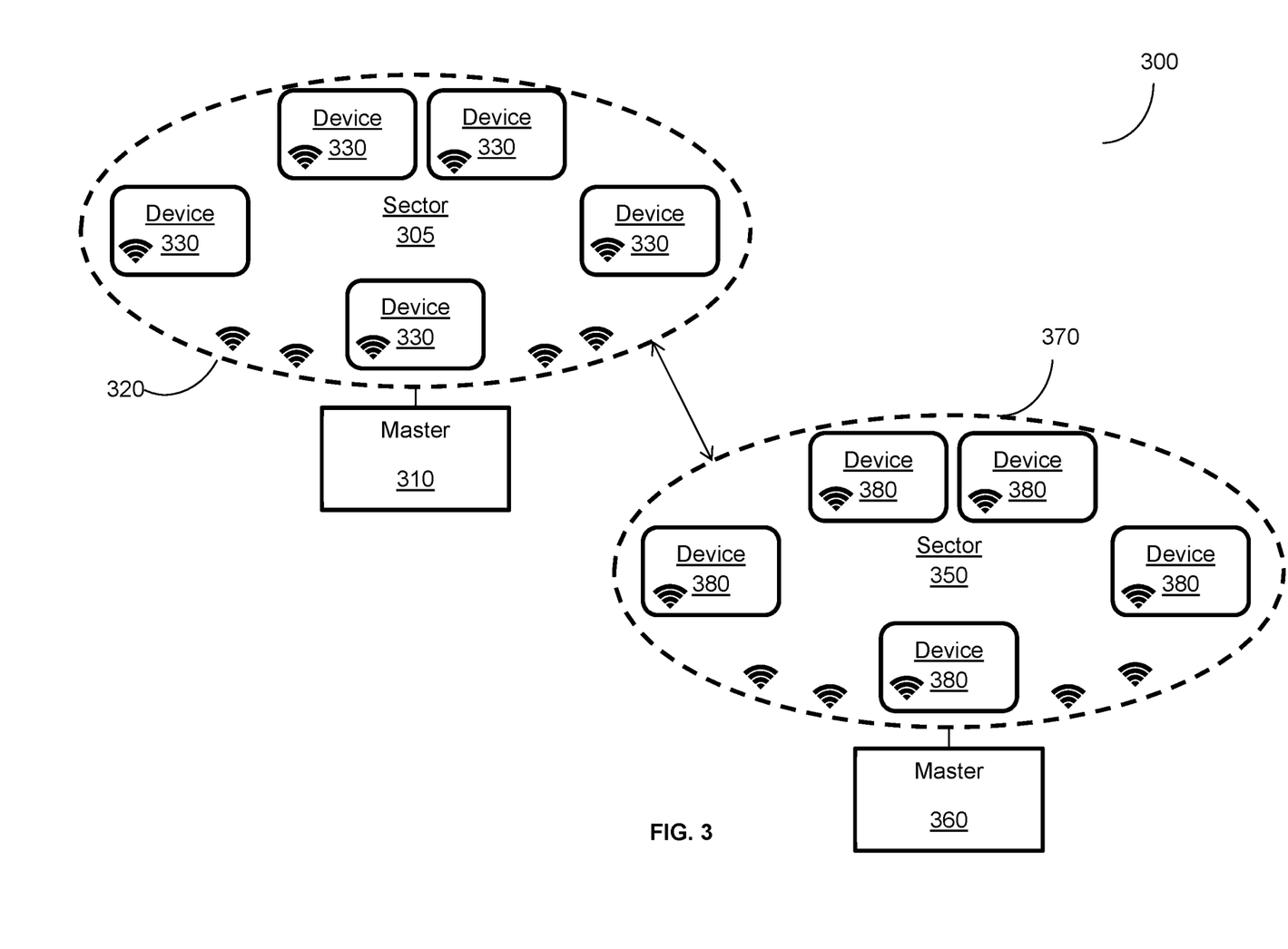
FIG. 3 is a diagram illustrating the deployment of a critical mission wireless link (CMWL) system utilized to describe the various embodiments.

FIG. 3 is an example diagram illustrating the deployment of a production floor 300, including a plurality of sectors, arranged according to the disclosed embodiments. As shown in FIG. 3, a sector 305 includes a master 310 connected wirelessly to a group 320 that includes devices 330. A sector 350 includes a master device 360 connected wirelessly to a second group 370 and devices 380. Each of the groups 320 and 370 is a transceiver.

As the 5 GHz frequency band bands allow communication over a wide bandwidth, there is no interferences between masters and devices in the sectors 305 and 350.

Figure 4:
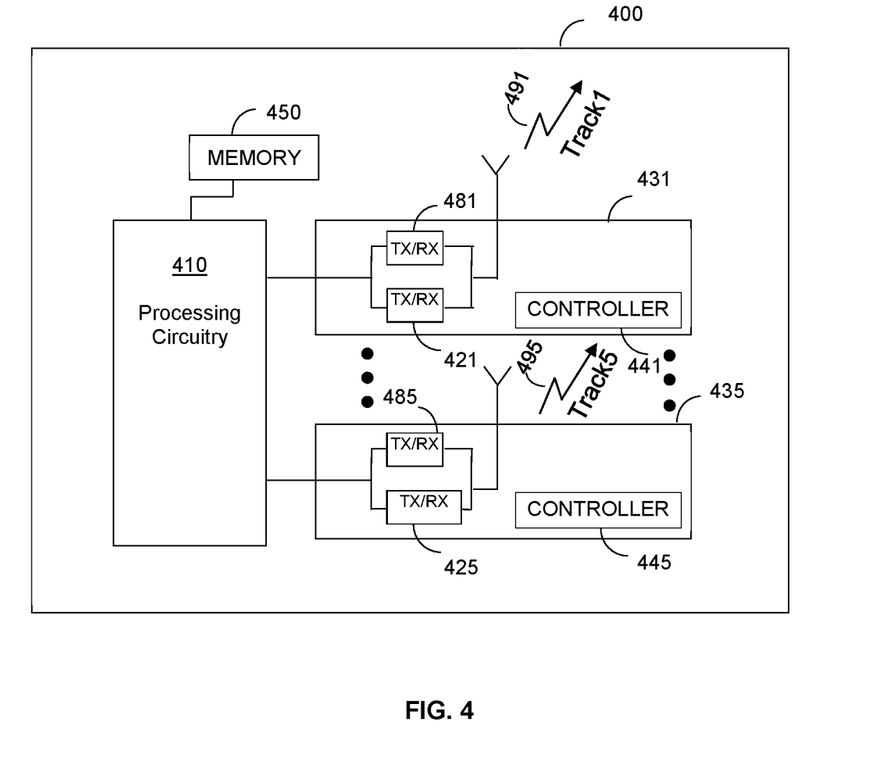
FIG. 4 is a block diagram of a master utilized to describe the various embodiments.

FIG. 4 is an example block diagram of a master gateway (or simply "master") utilized to describe the various embodiments. The master 400 is operable in a critical mission wireless link (CMWL) system. The master 400 is operable in accordance with the IO-Link Wireless standard as defined in "IO-Link Wireless System Specification", first version published in March 2018. In yet another embodiment, the CMWL is the Bluetooth Low Energy (BLE) standard.

However, according to the disclosed embodiments the master 400 is modified to transmit and receive wireless signals in a frequency band higher the frequency band (hereinafter "standard frequency") defined in the CMWL protocol of the CMWL system. For example, if the CMWL is an IO-Link Wireless, the standard frequency band is 2.4 GHz and the master 400 is configured to transmit wireless signals at the 5 GHz frequency band.

The master 400 includes a processing circuitry 410, a plurality of transceivers 431 through 435, and a memory 450. The master 400 communicates over multiple tracks 491 through 495 with a single transceiver 431 through 435 dedicated to each track. Each transceiver 431 through 435 contains a single transmitter 481 through 485, a single receiver 421 through 425 and a single synchronous modem controller 441 through 445. Each transceiver 431 through 435 also includes a single radio. In an example embodiment, each transceiver 431 through 435 is configured to receive and transmit wherein the at least one of the plurality of receivers is configured to receive, for example, a Gaussian frequency shift keying (GFSK) modulated signal.

According to the disclosed embodiments, each transmitter 481 through 485 is configured to perform an up-conversion of the transmitted radio signals from the standard frequency to a higher frequency band, for example, from a 2.4 GHz to 5 GHz. Further, each receiver 421 through 425 is configured to perform a down-conversion of the frequency of the received radio signals from a higher frequency to a standard frequency band, for example, from a 5 GHz to 2.4 GHz.

Figure 5A:
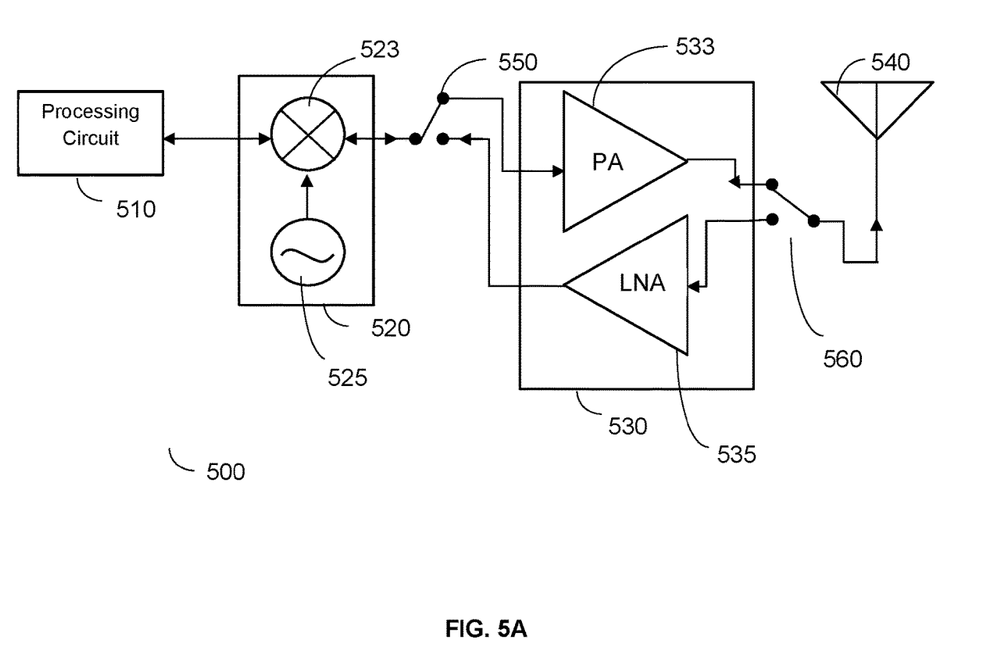
FIGS. 5A and 5B are diagrams of a transceiver utilized in a master of a CMWL according to some embodiments.
Figure 5B:
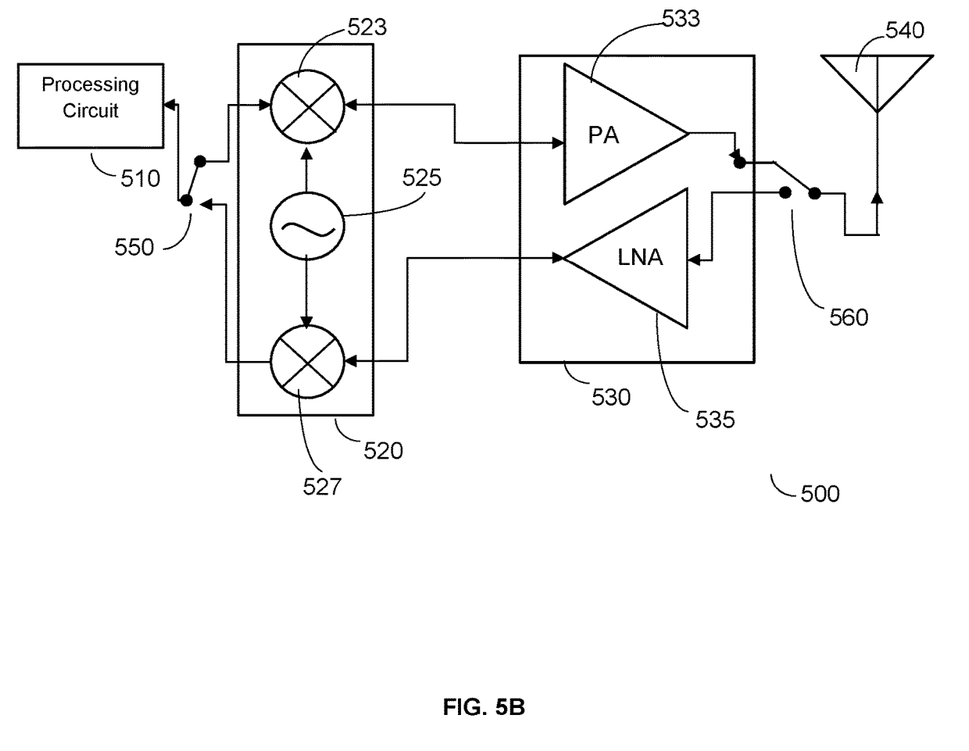

Examples and non-limiting implementation of a transceiver that can be utilized in the master 400 are provided in FIGS. 5A and 5B.

It should be noted that while five transceivers are shown in the example implementation of FIG. 4, this is by no means meant to limits the number of transceivers possible to be implemented in the current disclosure, and is merely used a non-limiting example.

The processing circuitry 410 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, and the like, or any other hardware logic components that can perform calculations or other manipulations of information.

The memory 450 may be volatile (e.g., RAM, etc.), non-volatile (e.g., ROM, flash memory, etc.), or a combination thereof. In one configuration, computer readable instructions to implement one or more embodiments disclosed herein may be stored in the memory 450.

In another embodiment, the memory 450 is configured to store software. Software shall be construed broadly to mean any type of instructions, whether referred to as software, firmware, middleware, microcode, hardware description language, or the like. Instructions may include code (e.g., in source code format, binary code format, executable code format, or any other suitable format of code). The instructions, when executed by the one or more processors, cause the processing circuitry 410 to perform the various processes described herein.

According to an embodiment, the master 400 wirelessly communicates with a plurality of devices (not shown) through tracks 491 through 495 using transceivers 431 through 435, respectively. The timing synchronization of transceivers 431 through 435 with the devices (not shown in FIG. 4) is controlled by synchronous modem controllers 441 through 445. That is, devices are synchronized to transceivers 431 through 435 using controllers 441 through 445 over the multicast downlink. The transceivers 431 through 435 within the master are all synchronized to the same circuit trigger (e.g., a strobe on each sub-cycle) using the processing circuitry 410. As demonstrated herein, the architecture of master 400 is based on a single receiver per transceiver and track, thereby simplifying the implementation and making it significantly more cost effective. An example of a master 400 is discussed in further detail in U.S. patent Ser. No. 10/652,059, assigned to common assignee, and incorporated herein by reference.

FIG. 5A is an example diagram of the transceiver 500 utilized in a master of a CMWL according to an embodiment. The transceiver 500 includes one of the transmitters 481-485 and the corresponding receiver 421-425 previously described in FIG. 4. The transceiver 500 or at least its receiver component is also implemented in devices (slaves) that allow at least a down conversion of the received signals (transmitted by the master) from the higher frequency band to the standard frequency band.

The transceiver 500 is designed to allow a master and its devices operable in a CMWL system to transmit and receive wireless signals at a frequency band higher than the frequency band defined in the CMWL standard (e.g., wireless IO-Link). This allows reduced interferences when multiple receivers (slaves) communicate with the master in a close proximity. It should be noted that a master and its devices communicate on the same frequency band.

The transceiver 500 includes a processing circuit 510, a Phase Lock Loop (PLL) and mixer circuit 520, a front end module (FEM) 530, and an antenna 540. The processing circuit 510 is coupled to the circuit 520 that includes a mixer 523 and an oscillator 525. In an embodiment, the oscillator 525 may be a low phase noise voltage control operator (VCO) that operates in the 85-4200 MHz frequency range, with a step size of about 1.5 MHz. The circuit 520 may also include a fractional-N synthesizer (not shown) to couple the oscillator 525 with the mixer 523. In an embodiment, the circuit 520 includes a filter configured to filter unwanted mixer products.

The mixer 523 may receive and transfer signals from the processing circuit 510, oscillator 525, or the FEM 530. The circuit 520 is configured to perform the up-conversion to allow transmitting signals at a higher frequency than the standard frequency and down-conversion to allow receiving signals at the higher frequency than the standard frequency, while processing of signals should be performed at the higher frequency.

In an embodiment, the FEM 530 is coupled to the circuit 520 via a first switch 550. The FEM 530 includes a Low Noise Amplifier (LNA) 535 and a Power Amplifier (PA) 533. The PA 533 amplifies radio signals for transmission through the antenna 540 while maintaining high Signal to Noise (S/N) ratio. The LNA 535 amplifies the received signals.

In operation, the signals operating at the standard frequency (e.g., 2.4 GHz) are sent from the processing circuit 510 to the circuit 520. Here, the standard frequency signals are mixed, by the mixer 523, with a signal from the oscillator 525 to up-convert to the standard frequency signals to higher frequency signals (e.g., 5 GHz). The up-converted signals are then sent via the first switch 550 to the PA 533 within the FEM 530. Then, the signals are transmitted via the antenna 540.

When higher frequency signals (e.g., 5 GHz signals) are received from the antenna 540, the signals are transferred via the second switch 560 to the LNA 535 within the FEM 530. Then, the received signals are down-converted into radio signals at the standard frequency (e.g., 2.4 GHz) by means of the mixer 523 and an signal from the oscillator 525. The down-converted signals have a standard frequency (e.g., 2.4 GHz) and are sent to the processing circuit 510 for additional processing.

FIG. 5B is an example block diagram of the transceiver 500 utilized as a master of a CMWL according to an embodiment. The transceiver 500 or at least its receiver component is also implemented in devices (slaves) that allow at least down conversion of the received signals (transmitted by the master) from the higher frequency band to the standard frequency band. Again, the transceiver 500 is designed to allow a master operable in a CMWL system to transmit and receive wireless signals at a frequency band higher than the frequency band defined in the CMWL standard (e.g., wireless IO-Link). This allows to reduce interferences when multiple receivers (slave devices) communicate with the master in a close proximity. It should be noted that a master and its devices communicate on the same frequency band.

Here, all of the elements of the transceiver 500 that are substantially the same as the transceiver 500 disclosed in FIG. 5A are not further described. Here, unlike in FIG. 5A, the PLL circuit 520 includes a second mixer 527 that is coupled to the oscillator 525, separate from the mixer 523 being also coupled to the oscillator 525.

In this embodiment, the mixer 523 is configured to perform the up-conversion to allow transmitting signals at a higher frequency than the standard frequency and mixer 527 performs the down-conversion to allow receiving signals at the higher frequency than the standard frequency.

In operation, the signals at the standard frequency (e.g., 2.4 GHz) are sent from the processing circuit 510 to the PLL circuit 520 via the first switch 550. Here, standard frequency signals (e.g., 2.4 GHz signals) are mixed with the signals from the oscillator 525 to be upconverted to signals the higher frequency band (e.g., 5 GHz). The upconverted signals are sent to the PA 533 to be transmitted via the antenna 540.

When signals at the higher frequency (e.g., 5 GHz) are received from the antenna 540, the signals is transferred via the second switch 560 to the LNA 535 within the FEM 530. The received signals are down-converted to the standard frequency signals (e.g., 2.4 GHz signals) by the second mixer 527. The down-converted signals are then sent to the processing circuit 510 for additional processing.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An apparatus for wirelessly increasing the number of communication channels in a critical mission wireless communication system installed in a confined area, comprising:
    a transmitter configured to transmit radio signals at a first frequency band, wherein the first frequency band is higher than a standard frequency band defined by a critical mission wireless communication protocol of the critical mission wireless communication system, wherein the transmitter comprises within a single transmitter housing circuitry to up-convert wireless signals created within the single transmitter housing from the standard frequency band to the first frequency band; and
    a plurality of receivers, wherein each of the plurality of receivers is adapted to receive signals at the first frequency band that were transmitted by the transmitter and wherein each of the receivers contains within a respective single receiver housing circuitry configured to down-convert the wireless signals received thereat from the transmitter at the first frequency band to the standard frequency band and to process within the single receiver housing the resulting down-converted wireless signals at the standard frequency band, and wherein each of the plurality of receivers and the transmitter are part of the critical mission wireless communication system.

2. The apparatus of claim 1, wherein the transmitter is within a master device.

3. The apparatus of claim 1, wherein each of the receivers is within a slave device.

4. The apparatus of claim 1, wherein the critical mission wireless communication system operates according to a wireless communication standard.

5. The apparatus of claim 4, wherein the wireless communication standard is an IO-Link Wireless standard, and wherein the standard frequency band is defined by the IO-Link Wireless standard.

6. The apparatus of claim 1, wherein the standard frequency band is a 2.4 GHz frequency band and the first frequency band is at least a 5 GHz frequency band.

7. The apparatus of claim 4, wherein the wireless communication standard is a Bluetooth Low Energy (BLE) standard, and wherein the standard frequency band is defined by the BLE standard.

8. The apparatus of claim 1, wherein the plurality of receivers, and the transmitter are deployed in a sector of a production line.

9. The apparatus of claim 1, wherein the critical mission wireless communication system operates in a master-slave star topology and wherein each of the plurality receivers is a slave device and wherein the transmitter is a master device.

10. The apparatus of claim 9, wherein each of the master device and the slave device is a transceiver.

11. A system, the system being a critical mission wireless communication system, comprising:
a plurality for sectors, wherein each sector is installed with an apparatus designed to increase a number of wireless communication channels in critical mission wireless communications, wherein each apparatus includes:
a transmitter configured to transmit radio signals at a first frequency band, wherein the first frequency band is higher than a standard frequency band defined by a critical mission wireless communication protocol of the critical mission wireless communication system, wherein the transmitter comprises within a single transmitter housing circuitry to up-convert wireless signals created within the single transmitter housing from the standard frequency band to the first frequency band; and
a plurality of receivers, wherein each plurality of receivers is adapted to receive signals at the first frequency band that were transmitted by the transmitter and wherein each of the receivers contains within a respective single receiver housing circuitry configured to down-convert the wireless signals received thereat from the transmitter at the first frequency band to the standard frequency band and to process within the single receiver housing the resulting down-converted wireless signals at the standard frequency band, and wherein each of the plurality of receivers and the transmitter are part of the critical mission wireless communication system.

12. The system of claim 11, wherein the system is deployed in any one of: a production line and an assembly line.

13. The system of claim 11, wherein the transmitter is within a master device.

14. The system of claim 11, wherein each of the receivers is within a slave device.

15. The system of claim 11, wherein the critical mission wireless communication system operates according to a wireless communication standard.

16. The system of claim 15, wherein the wireless communication standard is an IO-Link Wireless standard, and wherein the standard frequency band is defined by the IO-Link Wireless standard.

17. The system of claim 11, wherein the standard frequency band is a 2.4 GHz frequency band and the first frequency band is at least a 5 GHz frequency band.

18. The system of claim 15, wherein the wireless communication standard is a Bluetooth Low Energy (BLE) standard, and wherein the standard frequency band is defined by the BLE standard.

19. The system of claim 11, wherein the plurality of receivers, and the transmitter are deployed in a sector of a production line.

20. The system of claim 11, wherein the critical mission wireless communication system operates in a master-slave star topology and wherein each of the plurality receivers is a slave device and wherein the transmitter is a master device.

21. The system of claim 20, wherein each of the master device and the slave device is a transceiver.

* * * * *